United States Patent

Fukuyama

Patent Number: 5,225,671
Date of Patent: Jul. 6, 1993

[54] CONFOCAL OPTICAL APPARATUS

[75] Inventor: Hiroya Fukuyama, Tokyo, Japan

[73] Assignee: Olympus Optical Co., Ltd., Tokyo, Japan

[21] Appl. No.: 863,408

[22] Filed: Apr. 3, 1992

[30] Foreign Application Priority Data

May 29, 1991 [JP] Japan ............... 3-126054

[51] Int. Cl.[5] ............................................. H01J 3/14
[52] U.S. Cl. ................................. 250/216; 250/234; 359/368
[58] Field of Search ............... 250/234, 235, 236, 216; 359/368, 234

[56] References Cited

U.S. PATENT DOCUMENTS 5,086,222 2/1992 Shibuya ............... 250/234
5,101,295 3/1992 Lichtman et al. ............... 359/368

FOREIGN PATENT DOCUMENTS 61-140914 6/1986 Japan.

Primary Examiner—David C. Nelms
Attorney, Agent, or Firm—Frishauf, Holtz, Goodman & Woodward

[57] ABSTRACT

A laser beam emitted from a light source is transformed into a parallel beam by a collimator lens, and then reflected by a polarization beam splitter. Thereafter, the beam passes through a λ/4 plate, and is converged onto a sample plane by an objective lens. The light beam from the sample plane passes through the objective lens, the λ/4 plate and the polarization beam splitter, and entering into an image-forming lens. The image-forming lens comprises a convex lens and a concave lens. The focal length of the image-forming lens is long. Thus, the diameter of the airy disk of the beam converged by the image-forming lens is larger than that of a beam converged at a common focal point by a single convex lens. The converged beam passes through an aperture and enters into a photoelectric detector element which outputs a signal indicative of the intensity of the received beam. An image-forming unit forms an image of the sample plane on the basis of signals from the photoelectric detector element and a scanning unit, and the image is displayed on the display device.

5 Claims, 2 Drawing Sheets 5,225,671

CONFOCAL OPTICAL APPARATUS

BACKGROUND OF THE INVENTION

1. Field of the Invention

This invention relates to a confocal optical apparatus.

2. Description of the Related Art

Confocal optical apparatuses have image-forming characteristics superior to those of the conventional microscopes, and are employed in Scanning Laser Microscopes (SLM) or the like which have recently focused the spotlight of attention. An example of the confocal optical apparatuses is shown in FIG. 4. As is shown in the figure, a linearly polarized light beam such as laser beam emitted from a light source 12 is transformed into a parallel beam by means of a collimator lens 14, and then reflected by a polarization beam splitter 16. Subsequently, the reflected beam is converged onto a sample plane 22 by an objective lens 20. The light beam reflected from the plane 22 passes the objective lens 20, where it is again transformed into a parallel beam, and enters into the polarization beam splitter 16. Since the beam has passed a λ/4 plate 18 twice, the polarization of the light beam is rotated 90°, the beam passes through the splitter 16, and enters into an image-forming lens 24. The beam converged by the lens 24 is directed onto a shading plate 30 located at the focal point of the lens 24. The shading plate 30 has a pin hole 32. The beam having passed through the hole 32 enters into a photoelectric detector element 34. The beam from the plane 22 located at the focal point of the objective lens 20, travels along the optical path indicated by the solid line, and passes through a pin hole 32. On the other hand, a beam from the plane (indicated by e.g. a reference numeral 23) located out of the focal point of the objective lens 20, travels along the optical path indicated by the broken line, and almost all part of the beam is shaded by the shading plate 30 and hence does not enter into the photoelectric detector element 34. The element 34 provides an image-forming unit 36 with a signal indicative of the intensity of the received beam. A scanning unit 38 moves the sample, such that the beam spot is moved on the sample plane 22. The unit 38 supplies the image-forming unit 36 with a signal indicative of the position of the beam spot on the sample plane 22. The image-forming unit 36 forms an image of the sample plane 22 based on signals supplied from the photoelectric detector element 34 and scanning unit 38, and displays the image on a display unit 40. This image has a high contrast, i.e., a high resolution. Further, the optical apparatus has a resolving power along the optical path, and provides an image of a desirable plane of the sample, the operation is generally referred to as optical slicing.

In the above-described confocal optical apparatus, the image-forming lens 24 is generally constituted by a single convex lens. Referring now to FIG. 5, the diameter W2 of the airy disk is 50 μm with the lens 24 having a focal length of 180 mm. The pin hole, which has the diameter in accordance with that of the airy disk, is used. As stated above, the diameter of the airy disk is small, the diameter of the pin hole to be used has to be small, so that positioning of the pin hole is difficult. Further, the confocal apparatus cannot be constructed such that an iris diaphragm is used instead of the pin hole, thereby continuously changing the diameter of the aperture of the diaphragm. In addition, where the lens 24 has a long focal length, the diameter W3 of the airy disk will be large, as is shown in FIG. 6. For example, where the focal length of the lens 24 is 5,000 mm, the diameter W3 will be approx. 1 mm. Accordingly, the pin hole having a large diameter may be used, so that optical adjustment can be performed easily. In this case, an iris diaphragm may be used as the pin hole. However, since the focal length of the lens 24 is long, the apparatus is inevitably large. In order to make the apparatus compact, if the optical path is bent by a plane mirror, the amount of light may be disadvantageously reduced due to a loss in reflection at the plane mirror.

SUMMARY OF THE INVENTION

It is the object of the invention to provide a small confocal optical apparatus which has a pin hole whose position can be easily adjusted, or which can employ an iris diaphragm instead of the pin hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENTS

An embodiment of the invention will be explained in detail with reference to the accompanying drawings.

Figure 1:
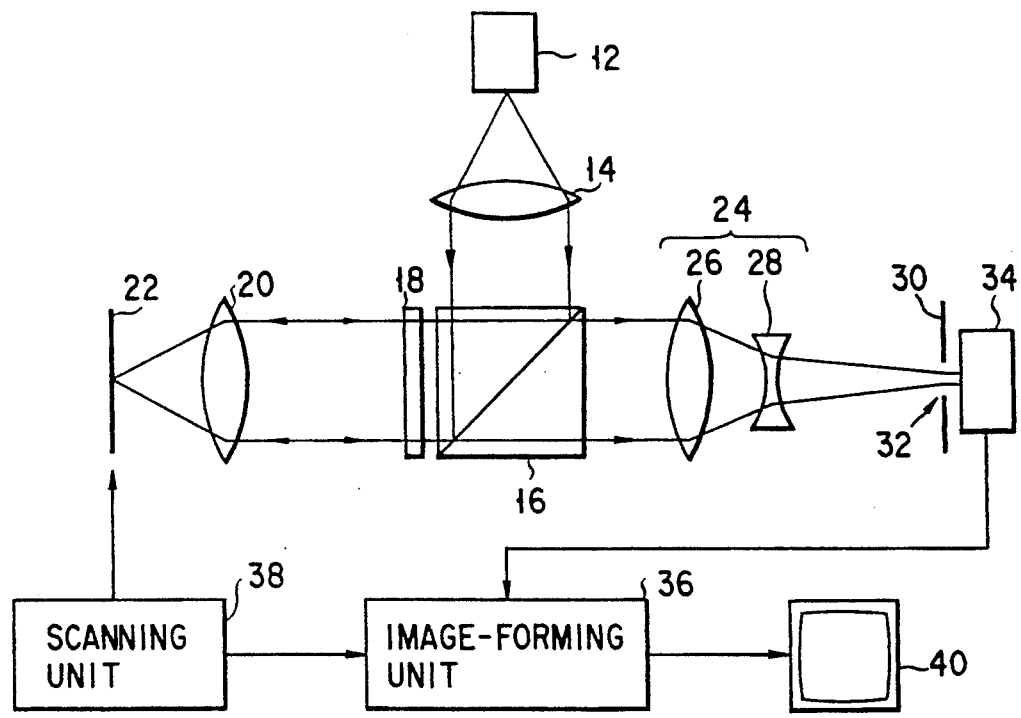
FIG. 1 shows a confocal optical apparatus according to the invention.

As is shown in FIG. 1, a laser beam from a light source 12 is transformed into a parallel beam by a collimator lens 14, then reflected by a poralization beam splitter 16, and converged onto the plane 22 in/on a sample by an objective lens 20. The light beam from the plane 22 enters into the objective lens 20, whereby it is transformed again into a parallel beam, and enters into the poralization beam splitter 16. Since the beam has passed a λ/4 plate 18 twice, the poralization of the beam is rotated 90°, the beam it passes through the splitter 16, and then enters into an image-forming lens 24. The beam converged by the lens 24 passes through a aperture 32 formed through a shading plate 30, and enters into a photoelectric detector element 34. The element 34 provides an image-forming unit 36 with a signal indicative of the intensity of the received beam. The unit 36 also receives a signal from a scanning unit 38, which represents a position of a beam spot on the plane 22, the beam spot being formed as a result of the beam being converged. The unit 38 forms an image of the plane on the basis of the signals. The image is displayed on a display device 40.

The image-forming lens 24 comprises a convex lens 26 arranged on the light entrance side, and a concave lens 28 arranged on the light outgoing side. The image-forming lens 24 thus constructed is a so-called telephoto-type lens, in which the incident light is converged to a high rate by the convex lens 26, and enters into the concave lens 28 where the rate of convergence is reduced. As a result, the focal length of the image-forming lens 24 is longer than a distance between a focal point and the convex lens 26. Thus, the airy disk of the converged light beam has a diameter larger than that of the light beam converged in the same position by a single convex lens having a focal length identical to the distance between the focal point and the convex lens 26. Accordingly, the aperture 32 to be used has a relatively large diameter. For example, where the image-forming lens 24 has a focal length of 5,000 mm and a telescopic ratio of 10, the distance between the convex lens 26 and the aperture 32 is 500 mm. Thus, the diameter of the airy disk is approx. 1 mm, so that the position of the aperture 32 can be easily adjusted. In this case, an iris diaphragm may be used in place of the aperture. Further, since the distance between the image-forming lens 2 and the focal point is 500 mm or so, the apparatus is made sufficiently small. In addition, it is difficult in general to design and manufacture the image-forming lens having the telescopic ratio of 10, however the image-forming lens 24 can be easily formed since the lens 24 is required to eliminate aberration on the optical axis.

Figure 2:
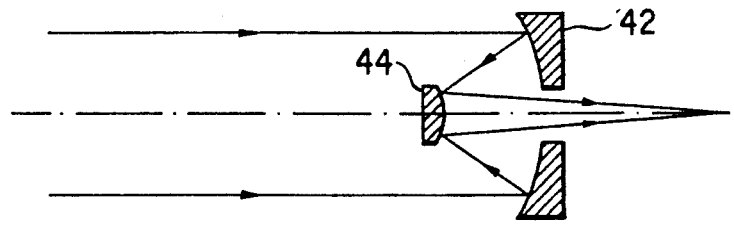
FIG. 2 shows a modification of an image-forming lens described in FIG. 1.

FIG. 2 shows a variation of the image-forming lens employed in the apparatus of Fig 1. This lens is a so-called reflection lens comprising two reflecting mirrors—a concave mirror 42 having an aperture at the center, and a convex mirror 44 having a diameter smaller than the concave mirror and arranged opposed thereto. Almost all part of the light beam except part shaded by the convex mirror 44 is guided to the concave mirror 42, then reflected on the surface thereof, and converged onto the convex mirror 44. The mirror 44 reduces the degree of convergence of the beam and guides the beam through the aperture of the concave mirror 42. The image-forming lens 24 constructed as above has the focal length is relatively long although the distance between the convex mirror 44 and the focal point is relatively short, as in the aforementioned image-forming lens. Thus, the same advantage as the above is obtained.

Figure 3:
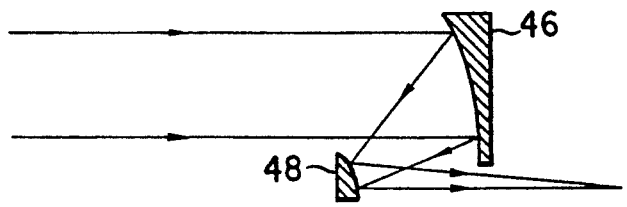
FIG. 3 shows another modification of the image-forming lens.
Figure 4:
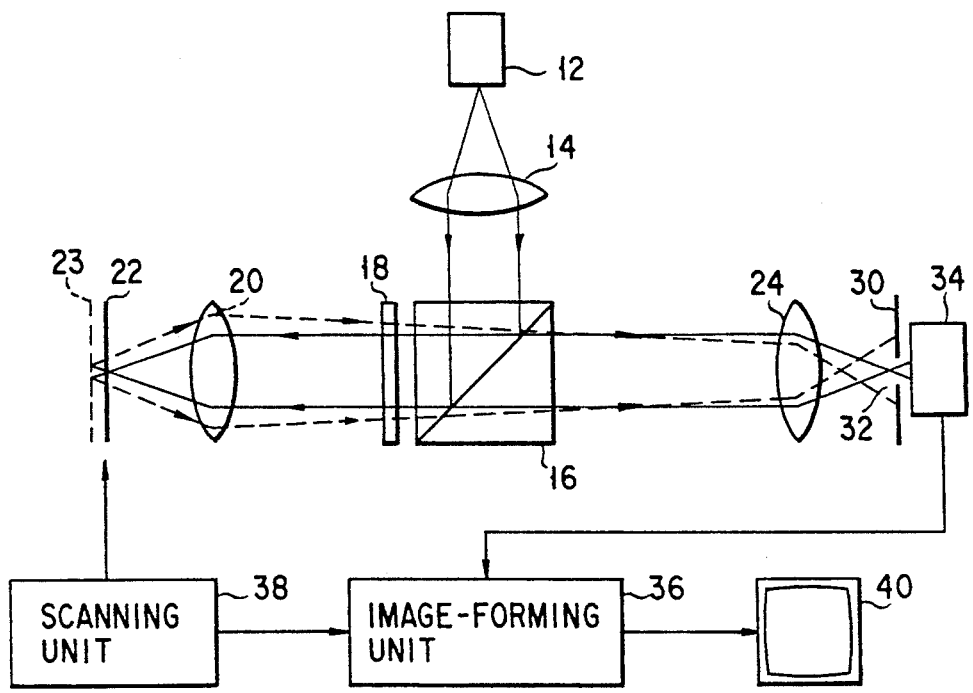
FIG. 4 shows a conventional confocal optical apparatus.
Figure 5:
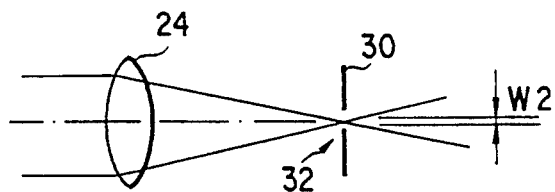
FIG. 5 shows convergence of light by an image-forming lens having a short focal length.
Figure 6:
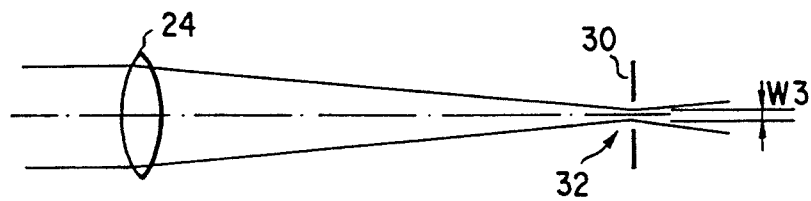
FIG. 6 shows convergence of light by an image-forming lens having a long focal length.

FIG. 3 shows another variation of the image-forming lens. This image-forming lens comprises a concave mirror 46 and a convex mirror 48, like the image-forming lens of FIG. 2. Light beam is reflected, converged and reflected by the concave mirror 46. The reflected light beam is guided onto the convex mirror 48 arranged outside the parallel light beam leading to the concave mirror 46. The mirror 46 reflects the light beam while being reducing the degree of convergence of the beam. As a result, the focal length is long, although the distance between the lens 24 and the convergence point is short, as in the aforementioned image-forming lenses.

This invention is not limited to the above-described embodiments, and various modifications and changes may be made without departing from the scope thereof. For example, though a confocal optical apparatus for detecting light reflected from the sample plane 22 is described and disclosed in the embodiment, it is a matter of course that the invention may be applicable to a fluorescence confocal laser microscope and to a transmission type confocal laser microscope.

What is claimed is:

1. A confocal optical apparatus for observation of a plane on or in a sample comprising:
   a light source for emitting a laser beam;
   means for converging the laser beam onto the plane;
   scanning means for scanning the laser beam over the plane;
   lens means having a positive power for converging light from the sample, the lens means including a first optical element having a positive power and a second optical element having a negative power, the first and second optical elements being located such that the light from the sample reach the first optical element and then the second optical element;
   a shading plate having an aperture for allowing the light from the plane to pass;
   detection means for detecting the intensity of the light passing through the aperture; and
   means for forming an image of the plane on the basis of signals from the scanning means and detection means.

2. The confocal optical apparatus according to claim 1, further comprising a display device for displaying the image of the plane.

3. The confocal optical apparatus according to claim 1, wherein the first optical element comprises a convex lens, and the second optical element comprises a concave lens.

4. The confocal optical apparatus according to claim 1, wherein the first optical element comprises a concave mirror, and the second optical element comprises a convex mirror.

5. The confocal optical apparatus according to claim 4, wherein the concave mirror is arranged coaxially with the convex mirror, with their reflecting surfaces opposed to each other, and has an opening for allowing reflected light from the convex mirror to pass through.

* * * * *